(12) United States Patent
Martini (10) Patent No.: US 8,893,255 B1
(45) Date of Patent: Nov. 18, 2014

(54) DEVICE AUTHENTICATION USING DEVICE-SPECIFIC PROXY ADDRESSES

(71) Applicant: Phantom Technologies, Inc., San Diego, CA (US)

(72) Inventor: Paul Michael Martini, San Diego, CA (US)

(73) Assignee: iboss, Inc., San Diego, CA (US)

( * ) Notice: Subject to any disclaimer, the term of this patent is extended or adjusted under 35 U.S.C. 154(b) by 0 days.

(21) Appl. No.: 14/061,591

(22) Filed: Oct. 23, 2013

(51) Int. Cl.
   *G06F 9/00* (2006.01)
   *H04L 29/06* (2006.01)

(52) U.S. Cl.
   CPC .................................. *H04L 63/0884* (2013.01)
   USPC ............................................ 726/12; 709/238

(58) Field of Classification Search
   USPC ............................................ 726/12; 709/238
   See application file for complete search history.

(56) References Cited

U.S. PATENT DOCUMENTS

| | | | |
|---|---|---|---|
| 5,983,350 A | 11/1999 | Minear et al. | |
| 6,298,383 B1 | 10/2001 | Gutman et al. | |
| 7,702,772 B2 * | 4/2010 | Kurup et al. | 709/223 |
| 8,291,487 B1 * | 10/2012 | Chen et al. | 726/12 |
| 2003/0204744 A1 * | 10/2003 | Maltais et al. | 713/201 |
| 2007/0050843 A1 * | 3/2007 | Manville et al. | 726/12 |
| 2008/0040789 A1 * | 2/2008 | Chen et al. | 726/12 |
| 2009/0049537 A1 * | 2/2009 | Chen et al. | 726/12 |
| 2010/0107235 A1 * | 4/2010 | Premec | 726/12 |
| 2012/0227101 A1 * | 9/2012 | Yuan | 726/12 |

OTHER PUBLICATIONS

Srisuresh, et al. "IP Network Address Translator (NAT) Terminology and Considerations", Network Working Group, RFC 2663, downloaded from the internet at http://tools.ietf.org/html/rfc2663, on Aug. 9, 2013, 60 pages.

* cited by examiner

*Primary Examiner* — Amare F Tabor
(74) *Attorney, Agent, or Firm* — Fish & Richardson P.C.

(57) ABSTRACT

Methods and systems for providing device authentication using device-specific proxy addresses are described. One example method includes associating a particular proxy network address with a device; receiving, over a network, a request to access a network resource, the request being received at the particular proxy network address; authenticating the device based on the particular proxy network address; and after authenticating the device, authenticating a user of the device based on user-specific credentials associated with the user.

18 Claims, 4 Drawing Sheets

DEVICE AUTHENTICATION USING DEVICE-SPECIFIC PROXY ADDRESSES

BACKGROUND

This specification generally relates to providing device authentication using device-specific proxy addresses.

In corporate and other networks, users may be required to authenticate to a proxy server prior to accessing the Internet. One widely used authentication scheme is HyperText Transfer Protocol (HTTP) Basic Authentication (Basic Auth). In Basic Auth, a client sends its username and password in unencrypted plaintext to a server, such as, for example, a proxy server. The server authenticates the client and subsequently allows the client access to other resources, such as the Internet. In such a configuration, an attacker can monitor network packets to obtain the username and password of the client, and possibly compromise the security of the network.

SUMMARY

In general, one aspect of the subject matter described in this specification may be embodied in systems, and methods performed by data processing apparatuses that include the actions of associating a particular proxy network address with a device; receiving, over a network, a request to access a network resource, the request being received at the particular proxy network address; authenticating the device based on the particular proxy network address; and after authenticating the device, authenticating a user of the device based on user-specific credentials associated with the user.

Details of one or more implementations of the subject matter described in this specification are set forth in the accompanying drawings and the description below. Other features, aspects, and potential advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A proxy server often is used by a network owner or administrator to control access to an external network, such as the Internet, by users of an internal network, such as a Local Area Network (LAN). A proxy server may also save Internet bandwidth and provide security by filtering users' access to objectionable or dangerous Internet sites. In some implementations, a proxy server may perform user-identity-based authentication, without regard to the particular device that the user is using to communicate with the proxy server. In such configurations, determining the identity of the device from which the user is accessing the proxy may be difficult, as the device's identity information may not be present in the request presented to the proxy. User credentials on internal networks are typically passed in unsecured, plaintext to the proxy server when authenticating the user, thus allowing an attacker to illicitly obtain user credentials of legitimate users simply by monitoring network traffic. Consequently, when a proxy server employs user-identity-based authentication, the attacker can use the illicitly obtained user credentials to access the proxy server using his or her own device.

With the recent proliferation of mobile devices, many network owners have adopted a Bring Your Own Device (BYOD) approach in which users can access internal networks using personal devices. In BYOD networks, shared devices provided by the network owner, and connected to the network, may also be used (e.g., communal PCs in a public library). In that case, identifying which device is accessing the proxy server may be preferable so that different Internet policies can be applied to it on a device-identity basis. A device identified during authentication as a shared device may require a policy that reflects that the device is shared by multiple users, whereas another device that was identified during authentication as being associated only with a single, specific user may have a different policy reflecting that fact. For example, a policy for a shared device may require that a user be logged out after a certain amount of time to allow other users access to the shared device, while a single-user may not require such a policy. Accordingly, the present disclosure describes systems and methods for separately authenticating a device and a user of the device.

In some implementations, a policy may be created by an administrator to configure the proxy settings for a set of devices that will be accessing a proxy server. Based on the policy, the proxy server may assign a unique proxy server address for each unique device. The unique proxy server address, which can be assigned randomly or by other mechanisms, enables the associated device to be uniquely identified, for example, by its serial number or MAC address. In some implementations, the proxy server address may include an Internet Protocol (IP) address, an IP version 6 (IPv6) address, a port number, and/or other types of addresses.

When a device attempts to access a network resource via the proxy server, the proxy server determines whether the proxy server address to which the request was sent matches the proxy server address assigned to the particular device. If the proxy server address of the request matches the device's assigned proxy server address, the proxy server authenticates the device.

Once the device's identity is determined, the authentication policy assigned to the device is checked. If the device's authentication policy requires a user login, the proxy server may redirect the device to a secure web page at which point, the user may be authenticated using the assigned credentials. The web page verifies the user's credentials (e.g., such as by communicating with an authentication system). Each proxy request (e.g., web page requests) from that point forward is made to the device-specific proxy address. The proxy server may deny any request originating from a device to a proxy server address that does not match its assigned proxy server address.

This approach has several potential advantages. First, it provides increased security by acquiring the user's credentials via a secure web page. Since no credentials are sent as unencrypted plaintext, an attacker cannot acquire the user's credential by simply monitoring network traffic. Further, the approach is easily implemented since it does not require any new protocols or require any additional information to be passed between the device and the proxy server for authentication.

Further, after the initial authentication, the device identity is known to the proxy server, thereby allowing the proxy server to perform device-specific actions, such as logging the user out of a specific device after a certain amount of time. For example, assume that a user A is logged into a BYOD network using his personal mobile device but then decides also to login to the BYOD network using a shared device without logging his mobile device out of the network (i.e., both devices are authenticated on the network concurrently with the same user credentials). Because the systems and techniques described here enable the proxy server to uniquely identify, and apply different policies to, the different devices with which they are communicating, the proxy server can apply policies to user A's mobile device that differ from the policies applied to the shared device that user A is using, even though both devices are logged into the network using the same user credentials. For example, a time-out policy could be applied to the shared device, in which case, user A is logged out of the shared device after a predetermined period of time, while user A's mobile device could be allowed to remain logged into the BYOD network indefinitely. The auditing and separate policy advantages described above may be realized in both networks utilizing insecure authentication mechanisms (e.g., Basic Auth) and in networks utilizing other, more secure authentication mechanisms.

Figure 1:
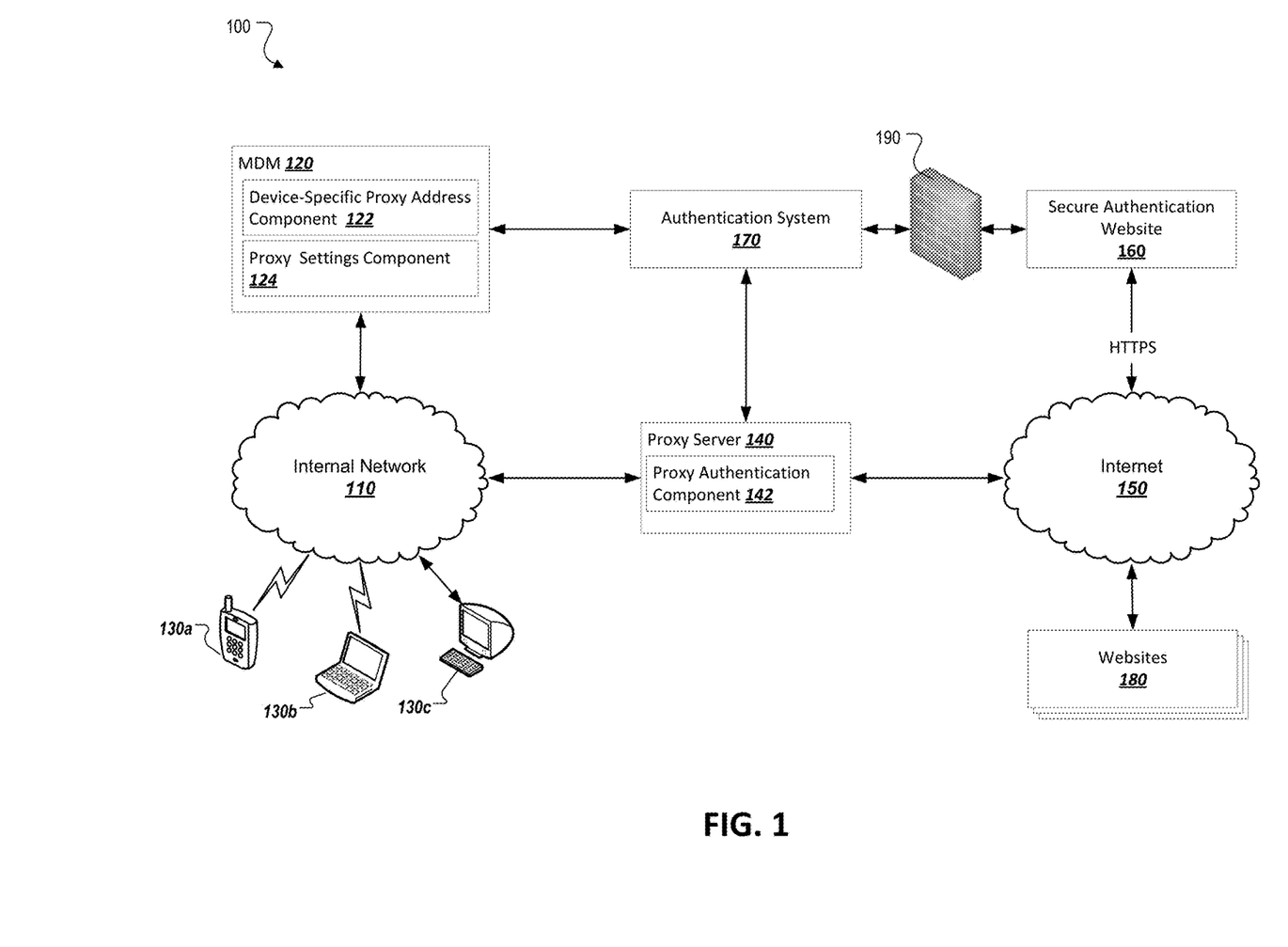
FIG. 1 is a diagram of an example environment.

FIG. 1 is a diagram of an example environment 100 in which various aspects of the subject matter described here may be implemented. The environment includes an internal network 110 separated from the Internet 150 by a proxy server 140. One or more devices 130a-c are connected to the internal network 110. The mobile device manager (MDM) 120 is connected to the internal network 110 to manage device settings and configuration for the one or more devices 130a-c. In operation, the MDM 120 may provide proxy settings to the one or more devices 130a-c. The provided proxy settings may include a device-specific proxy address associated with each device 130a-c. The devices 130a-c, in turn, may send requests to the proxy server 140 using their assigned proxy addresses. The proxy server 140 may verify that a request received on a certain proxy address is from the device assigned to that proxy address. If the proxy address matches, the proxy server 140 may allow the received request (e.g., by passing it on to the appropriate network resource). If the proxy address does not match, the proxy server 140 may reject the received request, such as by blocking the request, returning a response indicating the request was rejected (such as a "403 forbidden" response), and/or other actions.

The proxy server 140 may verify that the proxy address matches the proxy address assigned to the requesting device with an authentication system 170. After successful authentication, each device 130a-c may be assigned a limited access profile by the proxy server 140. In some implementations, the limited access profile may include an indication of whether user authentication is required. The limited access profile may permit each device 130a-c to access only the secure authentication website 160 via the Internet 150. The user of each device must then provide user-specific credentials to the secure authentication website 160. In some implementations, this interaction may occur over a secure mechanism, such as, for example, Secure Socket Layer (SSL) via HTTP Secure (HTTPS). The secure authentication website 160 authenticates the user-specific credentials with the authentication system 170. In some implementations, this interaction may occur through firewall 190 or through other security measures. Once the user's user-specific credentials are authenticated, the proxy server 140 updates the associated device profile to allow the device to access one or more websites 180 in addition to the secure authentication website 160. In some implementations, the subsequent requests from the device are correlated with the user by examining the user-specific credentials associated with the device, and a user-specific profile is applied to the request.

As shown, the environment 100 includes an internal network 110. In some implementations, the internal network 110 may be a wireless network provided by a corporation, educational institution, municipality, business, or other entity. Such a wireless network may utilize any standard wireless networking technology, including 802.11a, 802.11b, 802.11g, 802.11n, LTE, WiMax, CDMA or any other suitable wireless networking technology. In such implementations, the wireless network may be a public network in the sense that any device within range may connect to the network. Even though any device within range may connect to the internal network 110 in such configurations, the device still may be required to authenticate in order to access resources on the internal network 110 and/or on the Internet 150. Such a configuration is often referred to as a Bring Your Own Device (BYOD) network in which users are free to use their own personal devices for connecting to the network. In some implementations, the entity that controls the internal network 110 may issue devices to users for use on the internal network 110. The internal network 110 may also be a wired network, such as an Ethernet network.

The environment 100 also includes one or more devices 130a-c connected to internal network 110. In some implementations, the one or more devices 130a-c include mobile devices, such as cellular telephones (e.g., 130a), smartphones, tablets, laptops (e.g., 130b) and other similar computing devices. The one or more devices 130a-c may also include wired devices such as desktop computer 130c. In some implementations, the one or more devices 130a-c include personal devices associated with one or more users. The one or more devices 130a-c may also include devices issued or owned by the entity that provides the internal network 110, such as company-issued smartphones or laptops. In some implementations, the one or more devices 130a-c may include network access or web browsing software (e.g., a web browser) for accessing resources on the Internet 150.

In the illustrated implementation, the environment 100 also includes an MDM 120. In some implementations, the MDM 120 is configured to provide network settings to the one or more devices 130a-c. Network settings may include device-specific credentials, proxy settings, or any other suitable settings associated with the one or more devices 130a-c. In some implementations, the MDM 120 allows an administrator to configure profiles including the various settings described above, and assign the one or more devices 130a-c to these profiles. A device assigned to a profile may be assigned the settings associated with the profile. In this way, common settings may be applied to multiple devices at once without having to enter the common settings for each device individually.

In some implementations, the MDM 120 may be a server or set of servers located on the internal network 110 and accessible by the one or more devices 130 a-c. The MDM 120 may be operable to push network settings to the one or more devices 130a-c at various times such as, for example, according to a regular update schedule, when triggered by an administrator, when requested by a device, and/or any other appropriate time.

The MDM 120 also includes a device-specific proxy address component 122. In some implementations, the MDM 120 may allow an administrator to configure a profile such that each device assigned the profile will be configured with a device-specific proxy address. In such a configuration, the device-specific proxy address component 122 may associate a device-specific proxy address with each device on the internal network 110 based on the configured profile. For example, the device-specific proxy address component 122 may associate a different device-specific proxy address for each of the devices 130a-c. In some implementations, the device-specific proxy address may be assigned by device-specific proxy address component 122 according to parameters configured in the associated profile. For example, the device-specific proxy address component 122 may select a proxy address from an available pool of proxy addresses to assign to a particular device. The device-specific proxy address 122 may also assign a proxy address according to specific rules. For example, a rule may instruct the device-specific proxy address 122 to assign an IP address from an available pool, as well as a port number in the range of 1000 to 65535 to a device as a proxy address. In some cases, the assignment of proxy addresses to devices may be performed by a component external to the device-specific proxy address component 122, such as the authentication system 170. In such a case, the device-specific proxy address component 122 may query the authentication system 170 for the proxy address assigned to a particular device prior to proxy settings being applied to the device by the MDM 120.

In some implementations, the device-specific proxy address includes a network identifier, such as, for example, an IP address, an IPv6 address, an IP address and port combination, a Uniform Resource Locator (URL), and/or other network identifiers.

The MDM 120 also includes a proxy settings component 124. In some implementations, the proxy settings component 124 may store and send proxy configuration information to the one or more devices 130a-c. The one or more devices 130a-c may use the proxy settings to communicate, and authenticate, with the proxy server 140. In some implementations, the proxy settings may include, but are not limited to, an IP address and port of the proxy server 140, a list of authentication mechanisms accepted by the proxy server 140, and/or any other suitable proxy settings.

As shown, the environment 100 also includes a proxy server 140 connected to the internal network 110 and the Internet 150. In some implementations, the proxy server 140 search is a gateway to a wide-area network (WAN), such as the Internet 150, for the one or more devices 130a-c. Requests made by the devices may be first passed to the proxy server 140, which will then pass the request on to the Internet 150. In some implementations, the proxy server 140 may perform filtering on these requests, such as blocking access to resources on the Internet 150 that are known to include objectionable or otherwise prohibited content. Proxy server 140 may perform this filtering by analyzing requests sent by the one or more devices 130a-c, identifying requests for Uniform Resource Locators (URLs) of known prohibited sites, and returning a response to the sending device indicating that the request will not be fulfilled.

The proxy server 140 includes a proxy authentication component 142. In some implementations, the proxy authentication component 142 interacts with the authentication system 170 to determine whether each of the one or more devices 130a-c is permitted to access the Internet 150. In some implementations, the proxy authentication component 142 may communicate with the authentication system 170 via an Application Programming Interface (API), via one or more network protocols such as Lightweight Directory Access Protocol (LDAP), and/or by any other suitable means.

In some implementations, the proxy server 140 is configured to receive network requests from the one or more devices 130a-c. In such a configuration, the proxy server 140 may inspect a received request to determine the address to which the request was sent and to determine the device that sent the request. The proxy server 140 may then consult the authentication system 170 (discussed below) to determine whether the proxy address to which the request was sent matches the proxy address assigned to the device. In some implementations, the proxy server 140 may query the authentication system 170 for the proxy address assigned to the device that sent the request, such as by supplying an identifier for the device, such as a Medium Access Control (MAC) address associated with the received request. The proxy server 140 may then receive a response from the authentication system 170 indicating the proxy address associated with the device, and compare this proxy address with the proxy address to which the request was sent. If the proxy address matches the address configured for the particular device, the proxy server 140 may allow the request, such as by forwarding it to the appropriate network resource. If the proxy address does not match, the proxy server 140 may reject the request.

In the illustrated implementations, the proxy server 140 is connected to an authentication system 170. In some implementations, the authentication system 170 may include a domain controller that controls access on the internal network 110. In some cases, the domain controller may be a Microsoft® Active Directory system, an Apple® Open Directory system, an OpenLDAP system, a Novell® eDirectory system, and/or any other suitable domain controller or combination of domain controllers. In some cases, the authentication system 170 may interact with the MDM 120 in the process of provisioning device-specific proxy addresses. For example, the MDM 120 may communicate with the authentication system 170 to assign a new device-specific proxy address to a specific device.

As shown, the proxy server 140 is connected to the Internet 150. In some implementations, the Internet 150 is the public Internet. The Internet 150 may also be any network or combination of networks accessed from the internal network 110 via the proxy server 140. In such an implementation, the Internet 150 may be public, private, or a combination of the two. In some implementations, the Internet 150 is a distributed network utilizing the Transmission Control Protocol (TCP) in combination with HTTP to transmit requests for pages to web servers connected to the Internet 150, and to transmit responses from the web servers to the requesting clients.

The environment 100 also includes a secure authentication website 160 connected to the Internet 150. In some implementations, the secure authentication website 160 is accessed by the one or more devices 130a-c via the proxy server 140. The one or more devices 130a-c may access the secure authentication website using a secure communications method, such as, for example, HTTPS. The secure authentication website 160 may prompt the user of the one or more devices for user-specific credentials. In some locations, the user-specific credentials may include a username and password, a certificate, an encryption key, the token, or any other suitable credentials or combination of credentials. Because the user-specific credentials are transmitted using the secure communications method, an attacker cannot easily obtain the user-specific credentials by simply sniffing on the internal network 110.

When the user-specific credentials are received by the secure authentication website 160, the secure authentication website 160 communicates with the authentication system 170 to verify the user-specific credentials. This communication may occur through one or more security mechanisms, such as, for example, firewall 190. If the user-specific credentials are verified, the device associated with the user may be placed into a less restrictive profile allowing it to access additional websites in addition to the secure authentication website, such as, for example, the one or more websites 180.

In some implementations, after the user-specific credentials are received and verified, the proxy server 140 may associate each request received from the one or more devices 130a-c with the specific user currently using the device in question. This association may occur by examining the proxy address on which the request was received and determining the currently associated user-specific credentials. In some implementations, the proxy server 140 may apply a user-specific profile to requests from the one or more devices 130a-c based on the associated user-specific credentials. In some instances, the proxy server 140 may use the correlation between user and device to log users off of shared devices after a maximum usage time is reached.

Figure 2:
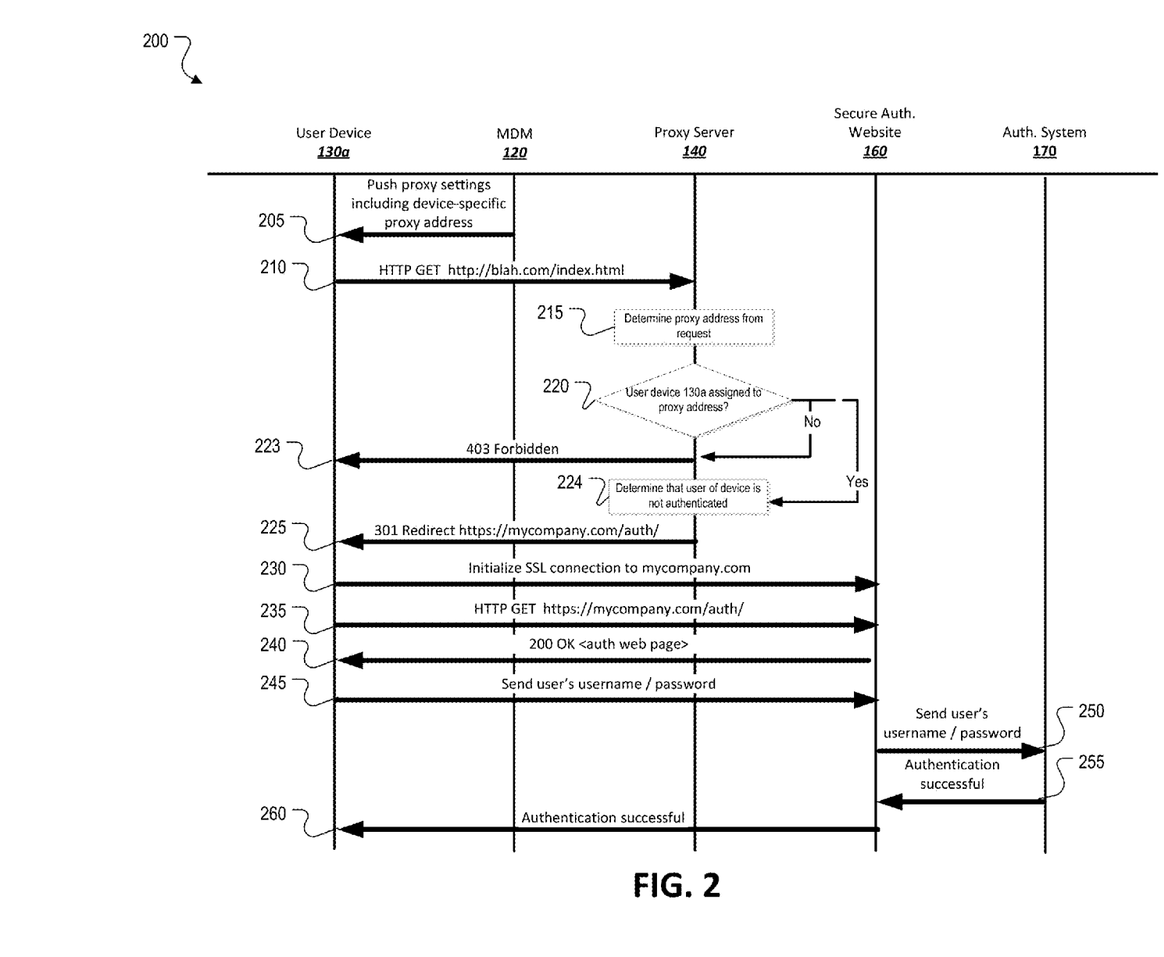
FIG. 2 is a message flow diagram of an example interaction between the components of the example environment to perform device authentication using device-specific proxy addresses.

FIG. 2 is a message flow diagram of an example interaction between the components of the example environment to perform device authentication using proxy addresses. In some implementations, the interaction 200 may include additional and/or different components not shown in the swim lane diagram. Components may also be omitted from the interaction 200, and additional messages may be added to the interaction 200.

At 205, the MDM 120 pushes proxy settings to the user device 130a. In some implementations, the proxy settings include information allowing the user device 130a to communicate with the proxy server such as, for example, a list of authentication mechanisms supported by the proxy server, and/or any other suitable settings information. The proxy settings may also include a device-specific proxy address associated with the user device 130a. In some implementations, the proxy settings are pushed to the user device 130a by the MDM 120 when an administrator updates a profile associated with the user device 130a, or assigns a new profile to the user device 130a. The proxy settings may also be pushed to the user device 130a by the MDM 120 according to a schedule, and/or when the user device 130a first appears on the network.

At 210, user device 130a sends a request via HTTP for the website associated with the URL http://blah.com/index.html via the proxy server 140. At 215, the proxy server 140 determines the proxy address associated with the request. In some implementations, the proxy server 140 may determine the proxy address by querying the operating system, such as by using the recv( ) system call and/or other mechanisms. The proxy server 140 may also examine the request itself to determine the proxy address. In some cases, the proxy server 140 may be configured with a plurality of proxy addresses, such that it can service requests from a plurality of devices that are each assigned a different proxy address.

At 220, the proxy server 140 determines whether the user device 130a is assigned to the proxy address determined at 215. In some cases, the proxy server 140 may consult another component to make this determination, such as the authentication system 170 or the MDM 120. If the proxy server 140 determines that the user device 130a is not assigned the proxy address to which the request was sent at 210, the proxy server 140 sends a rejection of the request to the user device 130a, such as the "403 Forbidden" response sent at 223. In some implementations, the proxy server 140 may perform other actions in response to determine that the proxy address does not match the proxy address configured for the device, such as, for example, deauthenticating the user device 130a from the network, notifying an administrator that the user device 130a has attempted to access a different proxy address than it is assigned, blocking the user device 130a from accessing the Internet 150 for a period of time, and/or other actions.

If the proxy server 140 determines that the user device 130a is assigned to the proxy address on which the request was received, the process continues to 224, where the proxy server 140 may examine this HTTP request and determine that it is originating from an unauthenticated user. Proxy server 140 may also determine that the user device 130a is assigned a limited access profile such that it can access only the secure authentication website 160.

In response to determining that the user device 130a is authenticated only with a device-specific proxy address, the proxy server 140, at 225, sends a redirect message to the user device 130a directing it to the secure authentication website 160. In some implementations, the redirection may be an HTTP redirect message including a URL associated with secure authentication website 160, as shown in FIG. 2. The redirection may also involve the proxy server 140 communicating with the secure authentication website 160 on behalf of the user device and forwarding the response page to the user device 130a.

At 230, the user device 130a initializes an SSL connection to the secure authentication website 160. In some implementations, 230 may involve handshaking or other interaction between the user device 130a and the secure authentication website 160. Although the secure connection is illustrated as an SSL connection in FIG. 2, other types of secure connections may be used, including, but not limited to, Transport Layer Security (TLS), Multiplexed Transport Layer Security (MTLS), connections where data is encrypted prior to transport with an encryption algorithm such as Advanced Encryption Standard (AES), and/or any other suitable technique.

At 235, the user device 130a sends an HTTP request to the secure authentication website 160. In some implementations, the HTTP request includes the redirection URL sent by the proxy server 140 at 225. At 240, the secure authentication website 160 responds with an authentication webpage. In some implementations, the authentication webpage includes features allowing the user of the user device 130a to enter a user-specific username and password into the authentication webpage. At 245, the user-specific username and password are then sent to the secure authentication website, such as, for example, when the user submits the authentication webpage. At 250, secure authentication website 160 sends the user-specific username and password to the authentication system 170 for verification. As discussed previously, this interaction may occur via a network protocol such as LDAP, via an API, or by any other suitable mechanism. At 255, the authentication system responds with indication that authentication was successful. In some implementations, if the user-specific username and password are not verified, the authentication system 170 may return an indication that authentication was not successful.

At 260, secure authentication website 160 sends an indication that authentication was successful to the user device 130a. In some implementations, this indication may be a webpage indicating successful authentication. Such a webpage may inform the user that they have successfully authenticated and are now free to browse the wider Internet.

Figure 3:
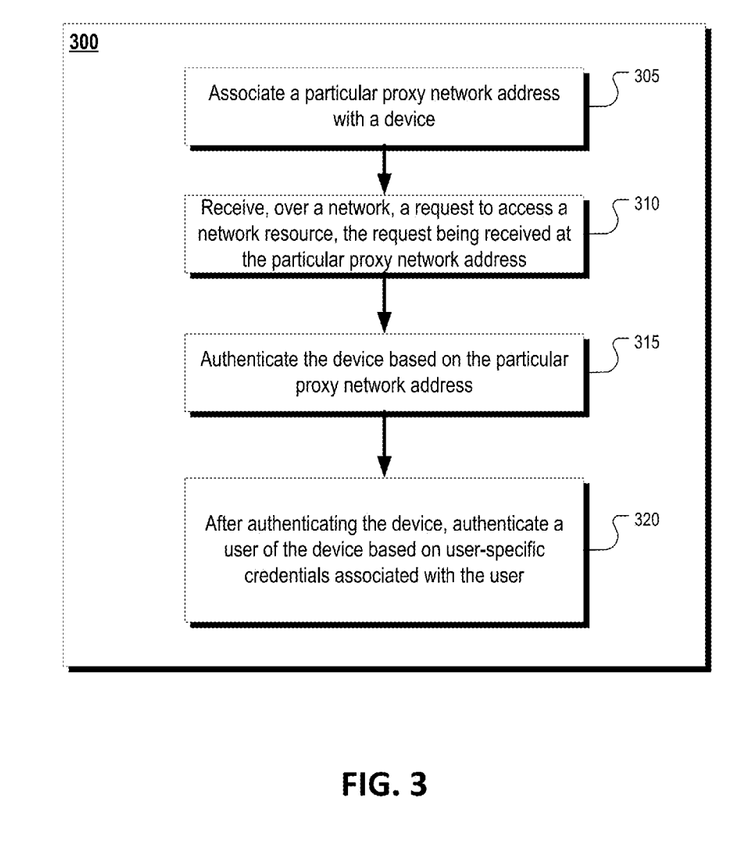
FIG. 3 is a flow chart of an example process of performing device authentication using device-specific proxy addresses.

FIG. 3 is a flow chart of an example process 300 of performing device authentication using device-specific proxy addresses. At 305, a particular proxy network address is associated with a device. The particular proxy network address may include an IPv4 address, an IPv4 port number, an IPv6 address, and/or other types of network addresses.

At 310, a request is received to access a network resource, the request being received at the particular proxy network address. At 315, the device is authenticated based on the particular proxy network address.

At 320, after authenticating the device, a user of the device is authenticated based on user-specific credentials associated with the user. In some cases, authenticating the user occurs via a secure method, such as, for example, HTTPS, SSL, TLS, and/or other methods.

In some implementations, the method 300 may also include associating the request to the device based on the particular proxy network address, logging the request, and logging the association of the request to the device. The method 300 may also include tracking a usage pattern of the device based on the user-specific credentials of the user of the device, and logging the user out of the device in response to the usage pattern indicating that the user has used the device for a time greater than a maximum usage time associated with the device.

Figure 4:
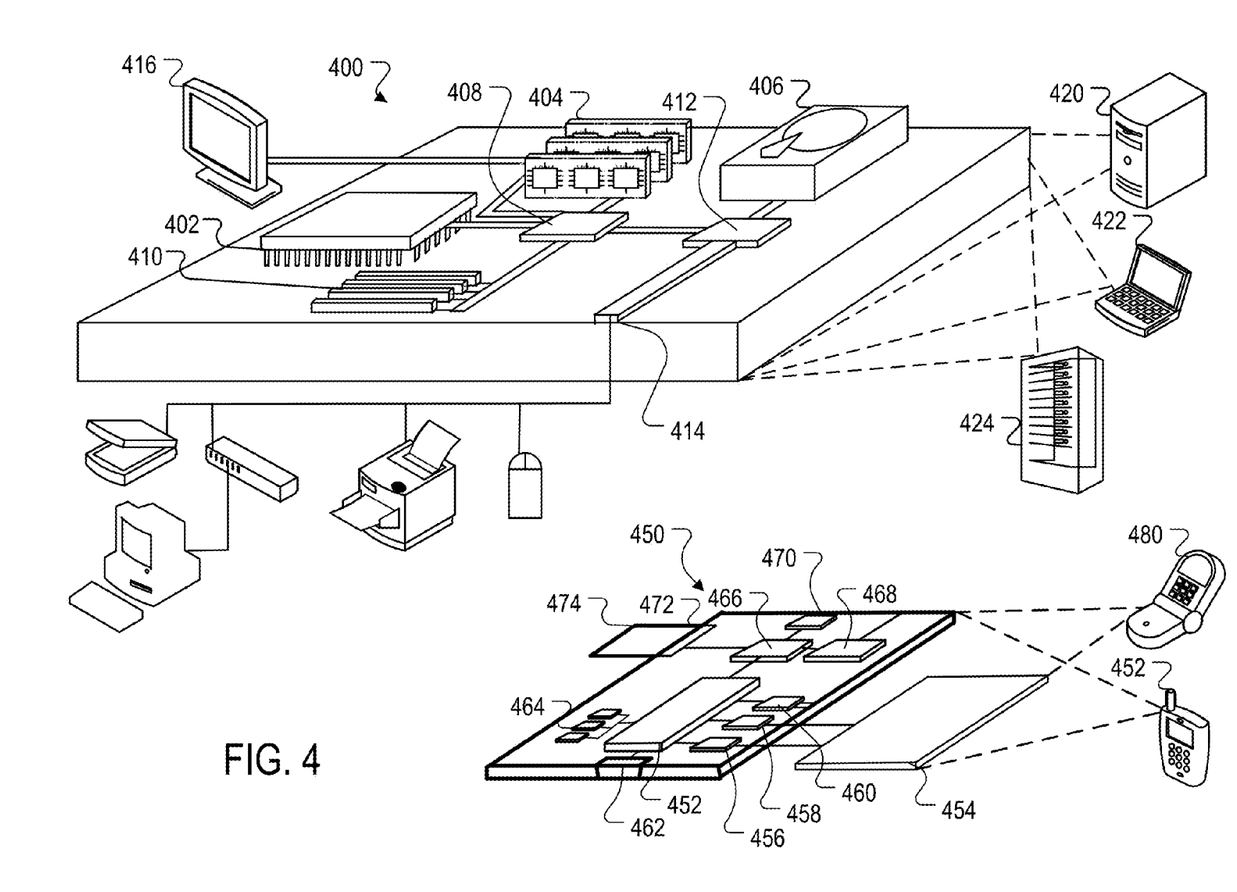
FIG. 4 is a diagram of computing devices that may be used to implement the systems and methods described in this document.

FIG. 4 is a block diagram of computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 450 is intended to represent various forms of mobile devices, such as personal digital assistants, cellular telephones, smartphones, and other similar computing devices. Additionally computing device 400 or 450 can include Universal Serial Bus (USB) flash drives. The USB flash drives may store operating systems and other applications. The USB flash drives can include input/output components, such as a wireless transmitter or USB connector that may be inserted into a USB port of another computing device. The components shown here, their connections and relationships, and their functions, are meant to be exemplary only, and are not meant to limit implementations of the inventions described and/or claimed in this document.

Computing device 400 includes a processor 402, memory 404, a storage device 406, a high-speed interface 408 connecting to memory 404 and high-speed expansion ports 410, and a low speed interface 412 connecting to low speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high speed interface 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a volatile memory unit or units. In another implementation, the memory 404 is a non-volatile memory unit or units. The memory 404 may also be another form of computer-readable medium, such as a magnetic or optical disk.

The storage device 406 is capable of providing mass storage for the computing device 400. In one implementation, the storage device 406 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 404, the storage device 406, or memory on processor 402.

The high speed controller 408 manages bandwidth-intensive operations for the computing device 400, while the low speed controller 412 manages lower bandwidth-intensive operations. Such allocation of functions is exemplary only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed expansion port 414. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as device 450. Each of such devices may contain one or more of computing device 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The device 450 may also be provided with a storage device, such as a microdrive or other device, to provide additional storage. Each of the components 450, 452, 464, 454, 466, and 468, are interconnected using various buses, and several of the components may be mounted on a common motherboard or in other manners as appropriate.

The processor 452 can execute instructions within the computing device 450, including instructions stored in the memory 464. The processor may be implemented as a chipset of chips that include separate and multiple analog and digital processors. Additionally, the processor may be implemented using any of a number of architectures. For example, the processor 410 may be a CISC (Complex Instruction Set Computers) processor, a RISC (Reduced Instruction Set Computer) processor, or a MISC (Minimal Instruction Set Computer) processor. The processor may provide, for example, for coordination of the other components of the device 450, such as control of user interfaces, applications run by device 450, and wireless communication by device 450.

Processor 452 may communicate with a user through control interface 458 and display interface 456 coupled to a display 454. The display 454 may be, for example, a TFT (Thin-Film-Transistor Liquid Crystal Display) display or an OLED (Organic Light Emitting Diode) display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of device 450 with other devices. External interface 462 may provide, for example, for wired communication in some implementations, or for wireless communication in other implementations, and multiple interfaces may also be used.

The memory 464 stores information within the computing device 450. The memory 464 can be implemented as one or more of a computer-readable medium or media, a volatile memory unit or units, or a non-volatile memory unit or units. Expansion memory 474 may also be provided and connected to device 450 through expansion interface 472, which may include, for example, a SIMM (Single In Line Memory Module) card interface. Such expansion memory 474 may provide extra storage space for device 450, or may also store applications or other information for device 450. Specifically, expansion memory 474 may include instructions to carry out or supplement the processes described above, and may include secure information also. Thus, for example, expansion memory 474 may be provide as a security module for device 450, and may be programmed with instructions that permit secure use of device 450. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452 that may be received, for example, over transceiver 468 or external interface 462.

Device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 468. In addition, short-range communication may occur, such as using a Bluetooth, WiFi, or other such transceiver (not shown). In addition, GPS (Global Positioning System) receiver module 470 may provide additional navigation- and location-related wireless data to device 450, which may be used as appropriate by applications running on device 450.

Device 450 may also communicate audibly using audio codec 460, which may receive spoken information from a user and convert it to usable digital information. Audio codec 460 may likewise generate audible sound for a user, such as through a speaker, e.g., in a handset of device 450. Such sound may include sound from voice telephone calls, may include recorded sound (e.g., voice messages, music files, etc.) and may also include sound generated by applications operating on device 450.

The computing device 450 may be implemented in a number of different forms, as shown in the figure. For example, it may be implemented as a cellular telephone 480. It may also be implemented as part of a smartphone 482, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), peer-to-peer networks (having ad-hoc or static members), grid computing infrastructures, and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. In addition, the logic flows depicted in the figures do not require the particular order shown, or sequential order, to achieve desirable results.

Other steps may be provided, or steps may be eliminated, from the described flows, and other components may be added to, or removed from, the described systems. Accordingly, other implementations are within the scope of the following claims.

What is claimed is:

1. A method performed by one or more data processing apparatuses, the method comprising:
   associating a particular proxy network address with a particular device identifier;
   receiving, over a network, a request to access a network resource from a device, the request being received at the particular proxy network address and associated with a device identifier;
   determining whether the device identifier associated with the request matches the particular device identifier associated with the particular proxy network address;
   authenticating the device in response to determining that the device identifier associated with the request matches the particular device identifier associated with the particular proxy network address;
   in response to authenticating the device, authenticating a user of the device based on user-specific credentials associated with the user; and
   tracking a usage pattern of the device based on the user-specific credentials of the user of the device.

2. The method of claim 1, wherein authenticating the user occurs via a secure method.

3. The method of claim 2, wherein the secure method includes HyperText Transfer Protocol Secure (HTTPS).

4. The method of claim 1, wherein the particular proxy network address includes an Internet Protocol version 4 (IPv4) address.

5. The method of claim 4, wherein the particular proxy network address includes an IPv4 port number.

6. The method of claim 1, wherein the particular proxy network address includes an Internet Protocol version 6 (IPv6) address.

7. The method of claim 1, further comprising:
   associating the request to the device based on the particular proxy network address; and
   logging the request and the association of the request to the device.

8. The method of claim 1, further comprising:
   logging the user out of the device in response to the usage pattern indicating that the user has used the device for a time greater than a maximum usage time associated with the device.

9. The method of claim 1, wherein associating the particular proxy network address with the device is performed during a configuration process for the device.

10. A system comprising:
    memory for storing data; and
    one or more processors operable to perform operations comprising:
      associating a particular proxy network address with a particular device identifier;
      receiving, over a network, a request to access a network resource from a device, the request being received at the particular proxy network address and associated with a device identifier;
      determining whether the device identifier associated with the request matches the particular device identifier associated with the particular proxy network address;
      authenticating the device in response to determining that the device identifier associated with the request matches the particular device identifier associated with the particular proxy network address;
      in response to authenticating the device, authenticating a user of the device based on user-specific credentials associated with the user;
      tracking a usage pattern of the device based on the user-specific credentials of the user of the device.

11. The system of claim 10, wherein authenticating the user occurs via a secure method.

12. The system of claim 11, wherein the secure method includes HyperText Transfer Protocol Secure (HTTPS).

13. The system of claim 10, wherein the particular proxy network address includes an Internet Protocol version 4 (IPv4) address.

14. The system of claim 13, wherein the particular proxy network address includes an IPv4 port number.

15. The system of claim 10, wherein the particular proxy network address includes an Internet Protocol version 6 (IPv6) address.

16. The system of claim 10, the operations further comprising:
    associating the request to the device based on the particular proxy network address; and
    logging the request and the association of the request to the device.

17. The method of claim 1, wherein the device identifier includes an Internet Protocol (IP) address.

18. The method of claim 1, wherein the device identifier includes a Media Access Control (MAC) address.

* * * * *

UNITED STATES PATENT AND TRADEMARK OFFICE
CERTIFICATE OF CORRECTION

| | | |
|---|---|---|
| PATENT NO. | : 8,893,255 B1 | Page 1 of 1 |
| APPLICATION NO. | : 14/061591 | |
| DATED | : November 18, 2014 | |
| INVENTOR(S) | : Paul Michael Martini | |

It is certified that error appears in the above-identified patent and that said Letters Patent is hereby corrected as shown below:

On the Title Page item (71),

Column 1, under Applicant, delete "Phantom Technologies, Inc.", insert -- iboss, Inc. --, therefor.

Signed and Sealed this
Thirty-first Day of March, 2015

Michelle K. Lee
*Director of the United States Patent and Trademark Office*